United States Patent [19]
Ibarrola et al.

[11] Patent Number: 5,808,466
[45] Date of Patent: Sep. 15, 1998

[54] PROCESS AND DEVICE FOR HIGH SPEED MEASUREMENT AND CHARACTERIZATION OF MAGNETIC MATERIALS

[75] Inventors: Jesus Echapare Ibarrola; Jose Luis Pina Insausti, both of Peralta, Spain

[73] Assignee: Azkoyen Industrial, S.A., Peralta, Spain

[21] Appl. No.: 874,887

[22] Filed: Jun. 13, 1997

Related U.S. Application Data

[63] Continuation of Ser. No. 281,214, Jul. 27, 1994, abandoned.

[30] Foreign Application Priority Data

Aug. 2, 1993 [ES] Spain ..................................... 9301734

[51] Int. Cl.⁶ .......................... G01R 33/12; G01N 27/72; G07D 7/00; G01V 3/10
[52] U.S. Cl. .......................... 324/239; 194/318; 209/569; 235/449; 324/232; 324/243
[58] Field of Search .................................... 324/232–243; 340/551, 572; 194/210, 213, 317–320; 209/567, 569; 235/449

[56] References Cited

U.S. PATENT DOCUMENTS

| | | |
|---|---|---|
| 4,086,527 | 4/1978 | Cadot ..................................... 324/239 |
| 4,326,198 | 4/1982 | Novikoff . |
| 4,622,542 | 11/1986 | Weaver . |
| 5,099,224 | 3/1992 | Santiago et al. . |

FOREIGN PATENT DOCUMENTS

| | | |
|---|---|---|
| 763681 | 10/1933 | France . |
| 505738 | 9/1981 | Spain . |
| 515482 | 9/1982 | Spain . |

*Primary Examiner*—Gerard R. Strecker
*Attorney, Agent, or Firm*—Evenson, McKeown, Edwards & Lenahan, PLLC

[57] ABSTRACT

A process for characterization of magnetic materials for validating documents carrying marks which include magnetic materials is based on an analysis of signals supplied by an oscillator generating a low frequency signal supplying emitter windings and receiver windings that have different conformations. The receiver windings (A) and (B) are joined to an amplifier that has two outputs (S1) and (S2), output (S2) yielding, upon conformation, a signal (X) that is used as a time reference, and output (S1) yielding, after various transformations, two signals (Y) and (Z), each of which is entered into a microprocessor which, together with valid magnetic marker data, generate signals accepting or rejecting the document.

2 Claims, 8 Drawing Sheets

PROCESS AND DEVICE FOR HIGH SPEED MEASUREMENT AND CHARACTERIZATION OF MAGNETIC MATERIALS

This is a continuation of application Ser. No. 08/281,214, filed Jul. 27, 1994, abandoned.

OBJECT OF THE INVENTION

The present invention relates to a process and device for high speed measurement and characterisation of magnetic materials, especially applicable to the validation of documents bearing marks consisting of such materials, detecting not only the presence of markers, but also capable of distinguishing different types of markers with precision, both as regards composition and dimensions and positioning within the document.

BACKGROUND OF THE INVENTION

Different processes and devices are currently known that are capable of detecting certain characteristics of magnetic materials, generally useful in marking products at public establishments.

The magnetic material, usually an amorphous magnetic material, when under a sufficiently intense alternating magnetic field, is saturated and causes a distortion that results in the appearance of harmonics of the frequency used in the exciter field. The signal that appears in the receiver, duly processed, represents the presence of the magnetic material exposed to the external field.

To illustrate the aforesaid idea, several references to documents in which systems, processes and apparatus are developed can be cited in which it is present in one way or another.

Now then, the object of patent FR-763,681 is to detect electromagnetic field harmonics when a highly permeable material is introduced in such field. To create the electromagnetic field, a winding is used and the receiver comprises another winding with two balanced loops that in the absence of magnetic material give no signal. The receiver signal is delivered to an amplifier and to a detection device.

U.S. Pat. No. 4,326,198 describes a system for detecting saturable magnetic materials generating interrogator magnetic field harmonics. The emitter used is a winding supplied by an oscillator and the receiver is another winding connected to the relevant detection circuitry, moreover using a static polarisation magnetic field.

U.S. Pat. No. 4,622,542 describes a monitoring method based upon harmonics analysis and a specific construction of the magnetic marker or element that allows other types used in similar applications to be distinguished. Known prior art parts of the device such as the oscillator, transmitter, receiver, antennas, phase comparator and control equipment are provided in this case.

Patent ES-505,738 describes an apparatus for detecting the presence, in the monitored area, of a highly permeable material body, based upon an analysis of the harmonics generated by the magnetic material, using transmission windings divided into two equal parts and two receiving figure eight-shaped windings, the latter balanced.

The processes described heretofore use low frequency electromagnetic fields comprised between tens of Hz. and some Khz. Other existing processes use high frequency electromagnetic fields, or high and low frequency signal combinations. In cases where high frequency (radio-frequency) electromagnetic fields are used, non-linear devices such as semi-conductor diodes are used in the markers, for amorphous materials do not respond to high frequencies.

Patent ES-515,482 uses a combination of high and low frequency fields, the marker responding to the high frequency field by means of a diode connected to a "J" shaped antenna, and to the low frequency field due to the provision of a highly permeable material, the response being analysed in both cases by measuring the harmonics generated by the marker in the high and low frequency fields.

Magnetic material analysis processes also exist that rely upon an analysis of the wave form provided by the receiver. Thus, U.S. Pat. No. 5,099,224, describes a process for identifying magnetic material magnetic features, in which the form of the signal given by the receiver is analysed when the material to be analysed is placed in a particular position. In this case, the field emitter comprises a winding inside which two receiver windings are positioned, connected in phase opposition, so that their response is non-existent in the absence of magnetic material. When magnetic material is introduced in one of the receiver windings, an electric signal appears at the output of such windings, which signal is amplified, sampled and converted to digital amplitude values. In a subsequent process, the values thus obtained are compared with stored values representing different types of magnetic materials. This process requires a complex analysis of the signal that needs expensive equipment to be purchased using higher process times.

DESCRIPTION OF THE INVENTION

The device and process for high speed measurement and characterisation of magnetic materials subject of the invention allows several magnetic materials to be characterised and then identified within a high speed process, especially applicable to the validation of documents incorporating marks comprising magnetic materials. The problems of this kind of application differ from those that exist in the valuable objects monitoring field, for here it is not only a case of detecting the presence of a marker, but it is moreover necessary to distinguish different markers precisely from each other, as regards both composition (magnetic properties) and dimensions and positioning within the document. All of this must be made precisely within a high speed measurement process, in other words, a short time interval is available for measurement and identification, rendering any known processes inviable, for such are not valid to distinguish between small dimensional changes in the marks, nor suitable for high speed movement applications.

The invention set forth provides a process for validating documents carrying marks comprising magnetic materials. To this end, a functional association is first established between a low frequency oscillator supplying emitter windings which create a magnetic field in the surveyed area, and a set of receiver windings, generally two in number, connected in parallel and connected to an amplifier. The design of the receiver windings is very important, for they must be suitably sized or, alternatively, the said receiver windings may be replaced by two or more windings positioned in the direction of movement of the document in order to achieve a large enough useful measurement area. This amplifier has two outputs, the first of which gives no signal in the absence of magnetic material in the surveyed area, whereas the second output gives a sinusoidal signal representing the interrogator magnetic field, which is passed through an amplifier yielding an X square wave signal that shall be used for time reference.

The first output is passed through an analogue differentiator and a signal is obtained that is on the one hand passed through an amplifier, generating an output Y, and is on the other hand introduced in a peak detector followed by an analogue-to-digital converter supplying an output Z that represents the digitalised value of the peak value of the analogue differentiator output.

Signals X, Y and Z are entered in a microprocessor that works with an operating program contained in an associated memory, in which the values representing the magnetic markers shall be contained. Signals from the input and output detectors of the surveyed document will also be entered into the microprocessor that shall respond with signals accepting or rejecting the document. It can similarly respond with signals representing the values read off the magnetic material contained in such document.

It should be noted that the construction and arrangement of the sensors can be different depending upon the requirements demanded of the detection system.

A system as described allows magnetic features of markers to be read in high speed processes, by means of a measurement process comprising using signal X as time reference (the upward or downward edge) and separately measuring the signal Y peak or peaks. The microprocessor shall at the same time take the signal Z measurement that represents the amplitude of the analogue differentiator output signal peaks, this operation being run for each and every cycle of the reference signal for the time during which the document passes through the electromagnetic field.

The microprocessor will additionally select the most favourable cycles (those in which the Z signal amplitude is largest) in order to eliminate false readings and shall consider the most stable reading from among all those selected as being favourable to be valid. The values thus measured represent the magnetic marker, and define the characteristics of the material, as well as the dimensional characteristics.

Signals X, Y and Z generated as described above and representing the characteristics and positioning of the marker, are easy to measure, and processing using a conventional microprocessor takes place simply and quickly, whence high speed identification is viable.

With the different sensor arrangements proposed, the process can be adapted to different applications of dynamic measures, thereby eliminating errors due to horizontal or vertical offsetting of the document.

DESCRIPTION OF THE DRAWINGS

In order to provide a fuller description and contribute to the complete understanding of the characteristics of this invention, a set of drawings is attached to the specification which, while purely illustrative and not fully comprehensive, shows the following.

PREFERRED EMBODIMENT OF THE INVENTION

Figure 1:
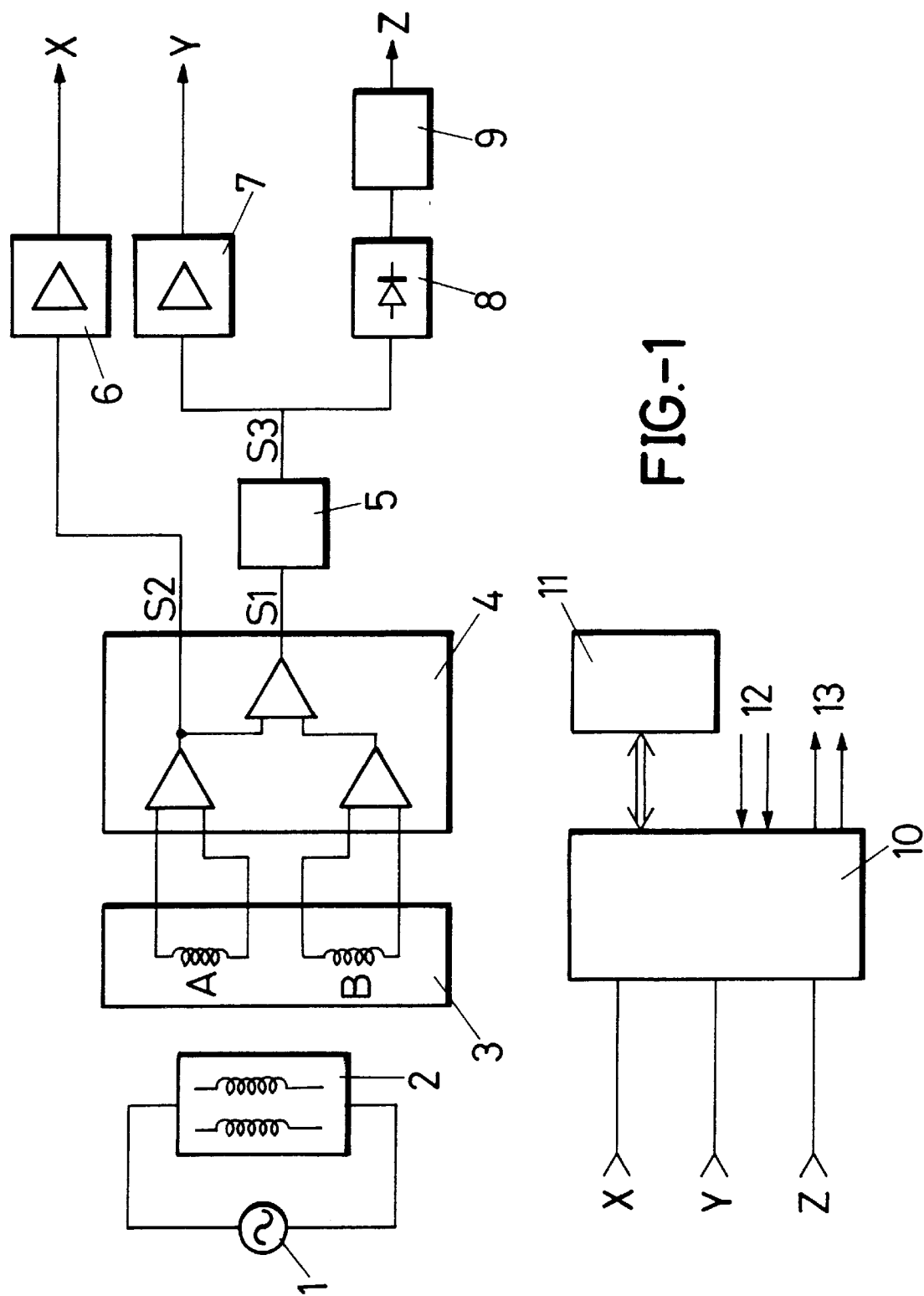
FIG. 1 is a block diagram of the device for high speed measurement and characterisation of magnetic materials supporting the process to measure the same.
Figure 2:
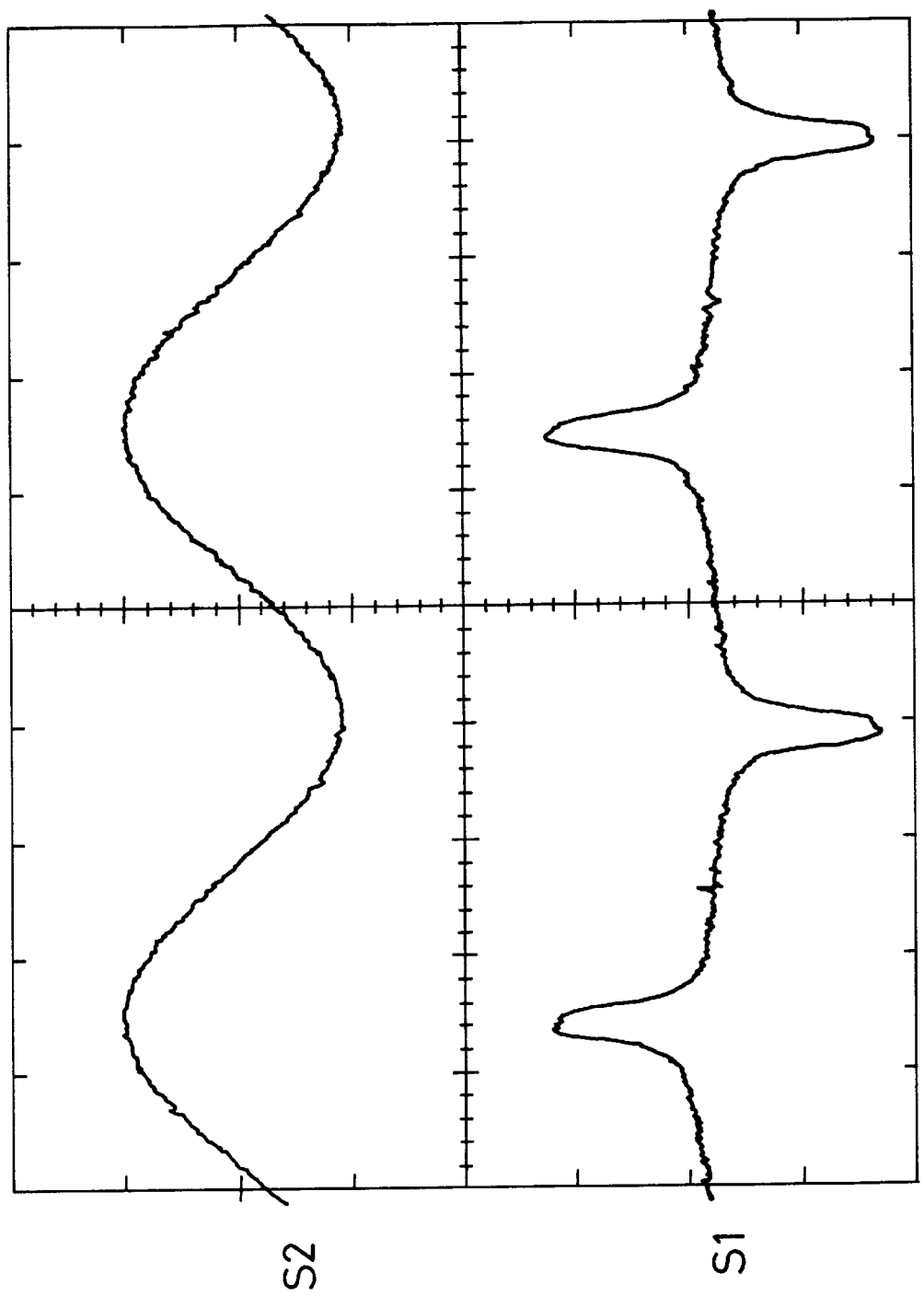
FIG. 2 shows the output signals of the amplifier connected to the receiver windings, when normal permeability magnetic material is used.
Figure 3:
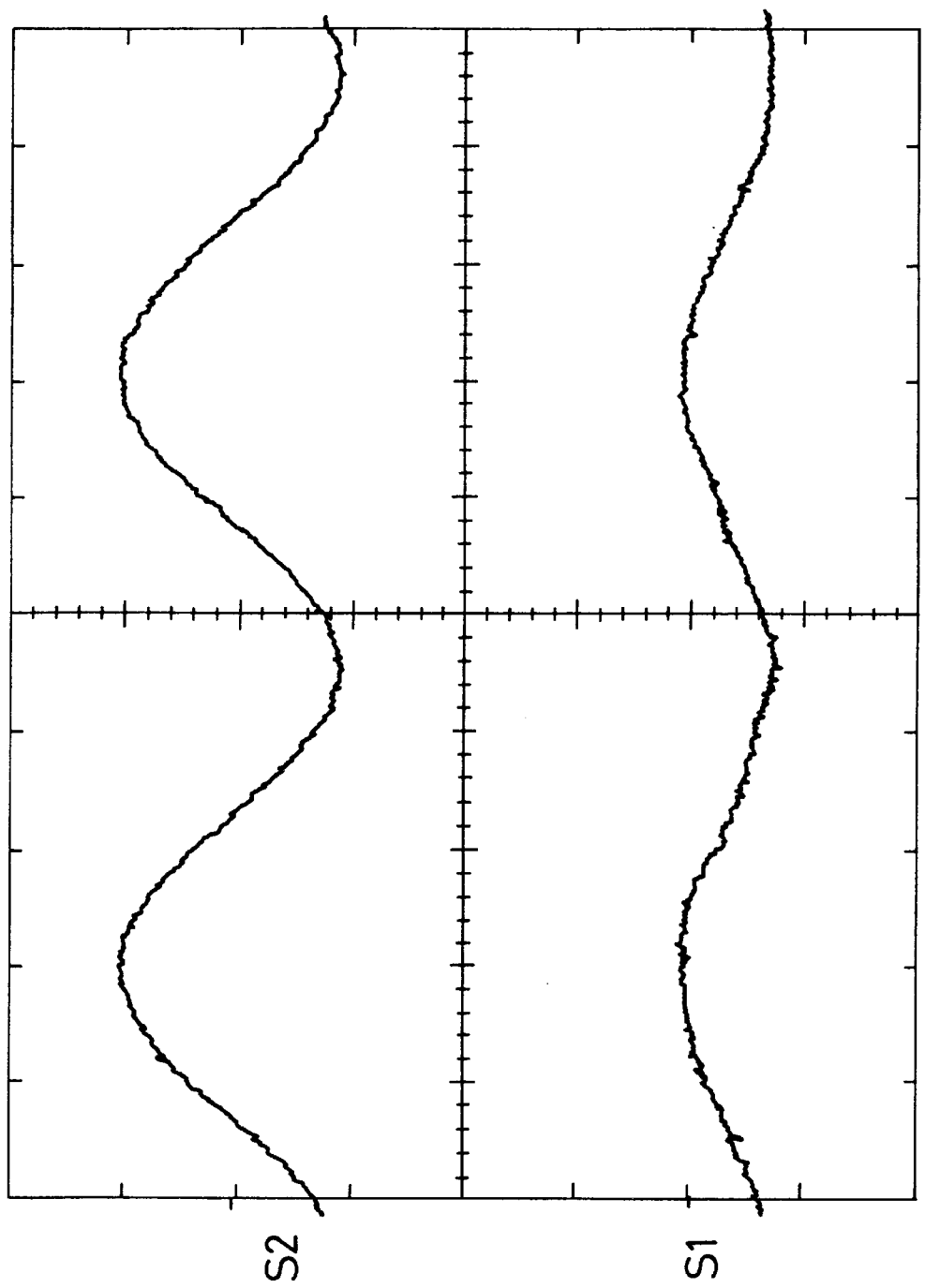
FIG. 3 shows the output signals of the amplifier connected to the receiver windings in the absence of magnetic material in the detection area.
Figure 4:
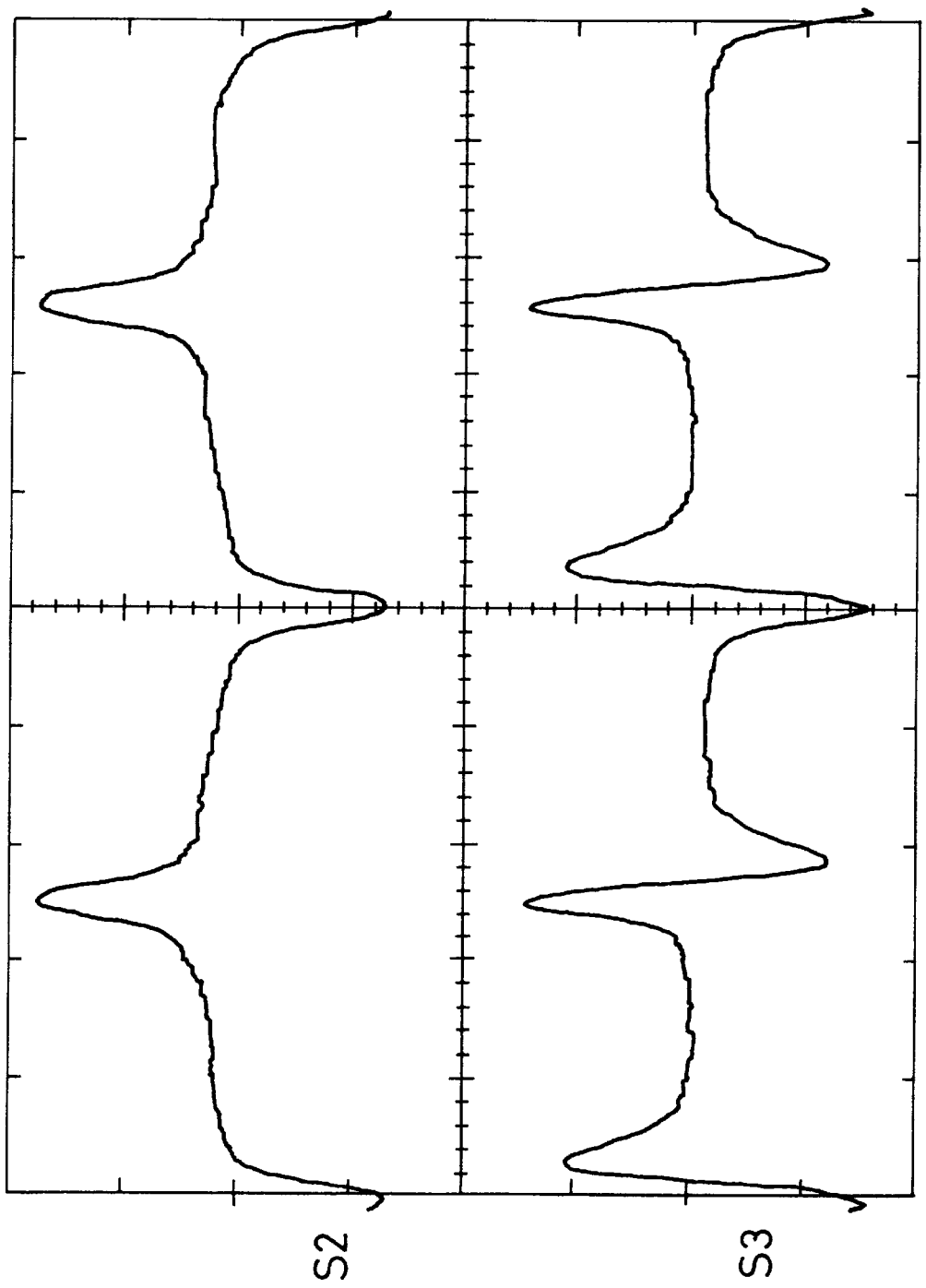
FIG. 4 shows the signals of one of the outputs of the amplifier connected to the receiver windings and the output of the analogue differentiator when a highly permeable material is used.
Figure 5:
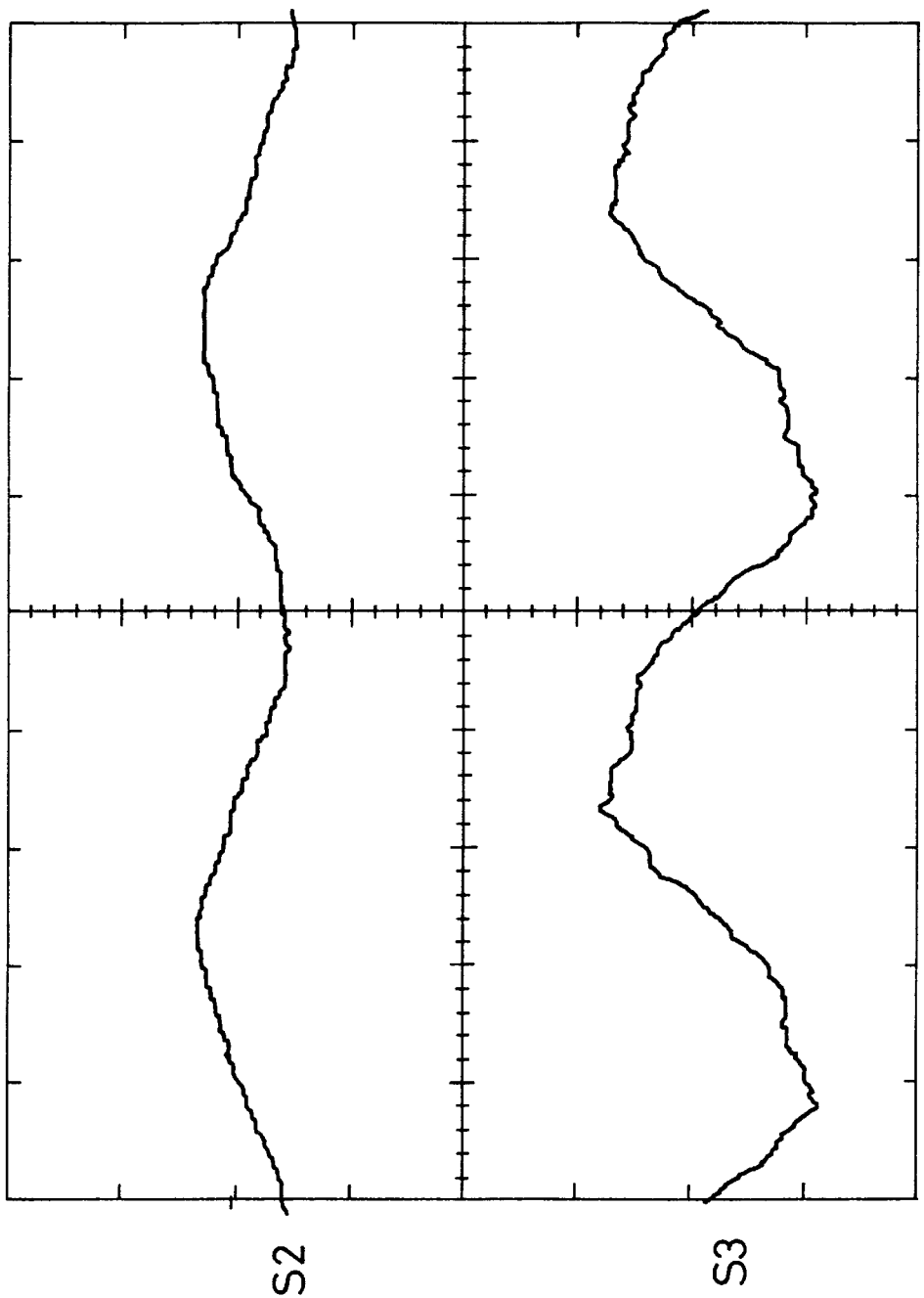
FIG. 5 shows the same output signals as the previous figure when the surveyed material has a normal permeability.
Figure 6:
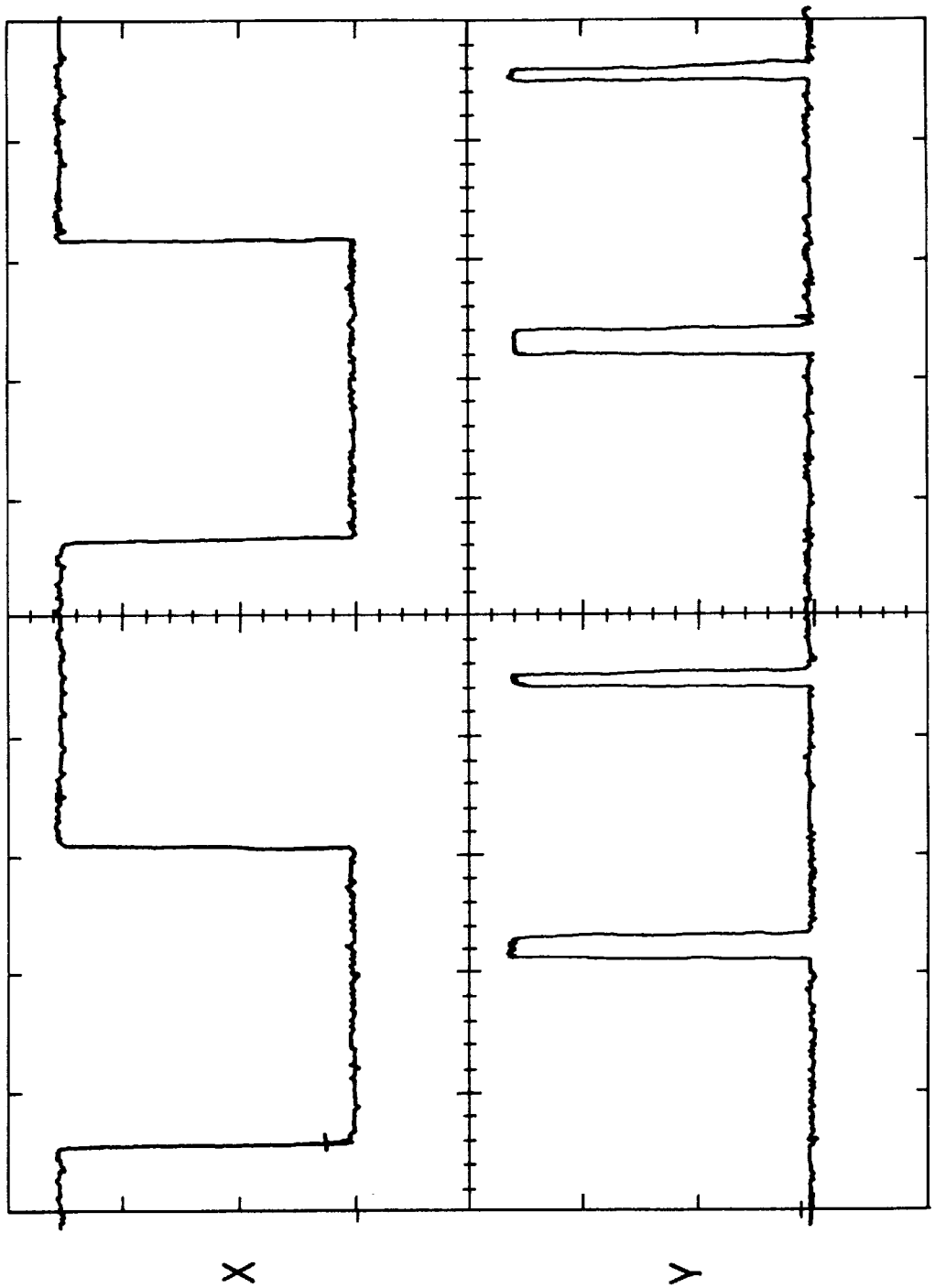
FIG. 6 shows signals X and Y when an easily saturable highly permeable material (amorphous magnetic material) is introduced in the field.
Figure 7:
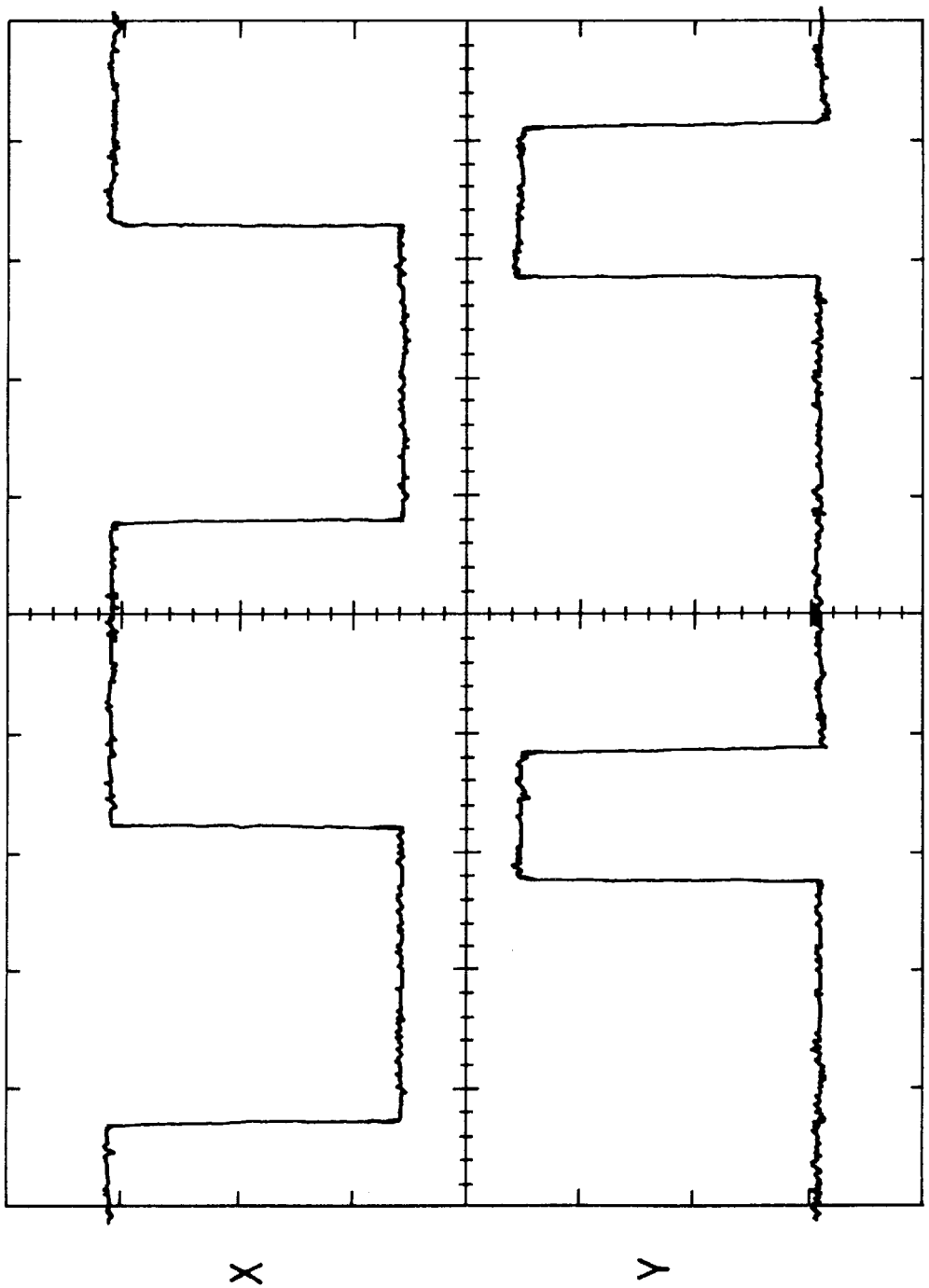
FIG. 7 shows the same signals as the above figure, when what is introduced in the field is a crystalline magnetic material that is not saturated with the field intensity used in the excitation.

The drawings show that the device and process for high speed measurement and characterisation of magnetic materials subject hereof relies upon a structure as shown in FIG. 1 in which an oscillator (1) generating a low frequency (typically 1 kHz) signal supplies emitter windings (2) creating a variable magnetic field in the surveyed area, all in functional association with a set of receiver windings (3) generally being two in number (A) and (B), that can have different arrangements, such as connected in parallel and connected to an amplifier (4) that has two outputs (S1) and (S2), the first of which will give no signal in the absence of magnetic material in the surveyed area, whereas the second output will give a sinusoidal signal representing the interrogator field.

The receiver windings must be suitably sized or, alternatively, each such receiver winding may be replaced by two or more windings that will be positioned in the direction of movement of the document, in such a way that with this a rather broad useful measurement area shall be obtained.

Output (S1) is passed through an analogue differentiator (5) to yield an output signal (S3).

Outputs (S2) and (S3) reach two adaptor amplifiers (6) and (7) to obtain in the first case a square wave signal (X) that shall be taken as time reference, and in the second case an output signal (Y). The same output (S3) is introduced in a peak detector (8) that will subsequently, by means of an analogue-to-digital converter (9), yield a signal (Z) representing the digitalised peak value of the signal (S3), which is entered with signals (X) and (Y) in the microprocessor (10).

The microprocessor (10) works with an operating program contained in a memory (11) in which the values representing the valid magnetic markers are also to be found. Furthermore, signals (12) from the inlet and output detectors of the surveyed document shall be entered into the microprocessor (10), that shall respond with signals (13) accepting or rejecting the same. It can just as well respond with signals representing the values read off the magnetic material contained in such document.

The assembly used gives two impulses per signal (Y) cycle when the material is saturated (high permeability magnetic material) while only one impulse per cycle appears when it is not saturated.

As aforesaid, this system allows the magnetic characteristics of markers to be read in high speed processes. To this end, the frequency of the interrogator magnetic field shall be elected in such a way that during the time of passage of the marker through such field, the latter shall have undergone successive cycles. For instance, ten cycles are deemed to be sufficient to obtain a good measurement, which means that for a field frequency of 1 kHz, the measurement process lasts for 10 ms, fast enough for high speed identification applications. The signal process run by the circuitry and the microprocessor (10) described above must however also be fast.

It should be noted that the analogue signal (S3) generates two signals, the first (Y) being an impulse signal and the latter (Z) being a digital signal representing the peak value of each cycle of the signal (S3). The signal (X) is a square wave signal representing the exciter field. In the measurement process, signal (X) is used as time reference and the distance between and length of the peak or peaks in signal (Y) is measured at the same time as the microprocessor (10) reads the signal (Z) representing the amplitude of the signal (S3) peaks, this operation being carried out for each and every one of the cycles of signal (S2) during the time of passage of the document through the electromagnetic field.

Figure 8:
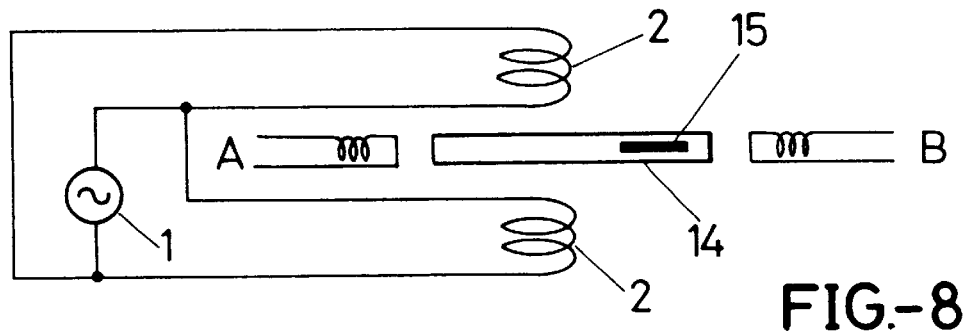
FIG. 8 shows an arrangement of the sensors in which the emitters and receivers are located symmetrically to each other about the axis of symmetry of the document.

As to the arrangement of the sensors, as shown in FIG. 8, the emitters (2) and receivers (A) and (B) are located symmetrically to each other about the axis of symmetry of the document (14) inside which the magnetic material to be detected or marker (15) is to be found. Windings (A) and (B) are in phase and are balanced by means of a differential amplifier.

Figure 9:
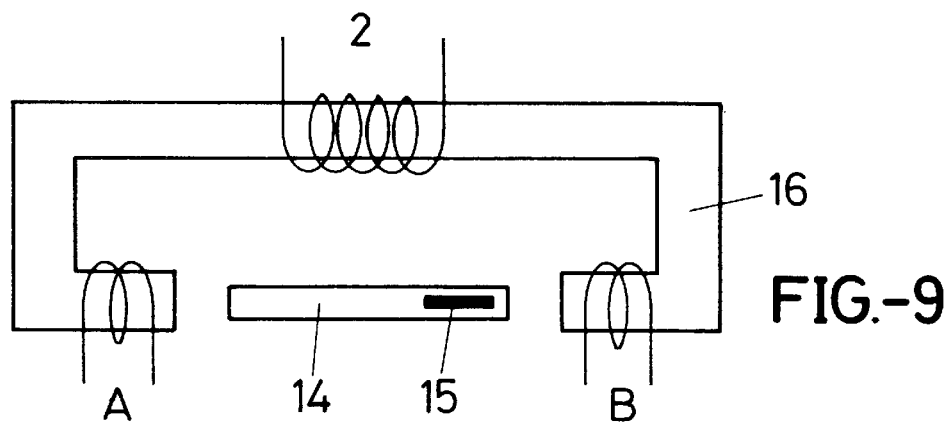
FIG. 9 shows an arrangement similar to the above, albeit with only a single emitter winding.

Another arrangement similar to the above but with a single emitter winding (2) is shown in FIG. 9, in which the magnetic core (16) is expressly provided on which both the emitter (2) and receiver (A) and (B) windings are arranged.

Figure 10:
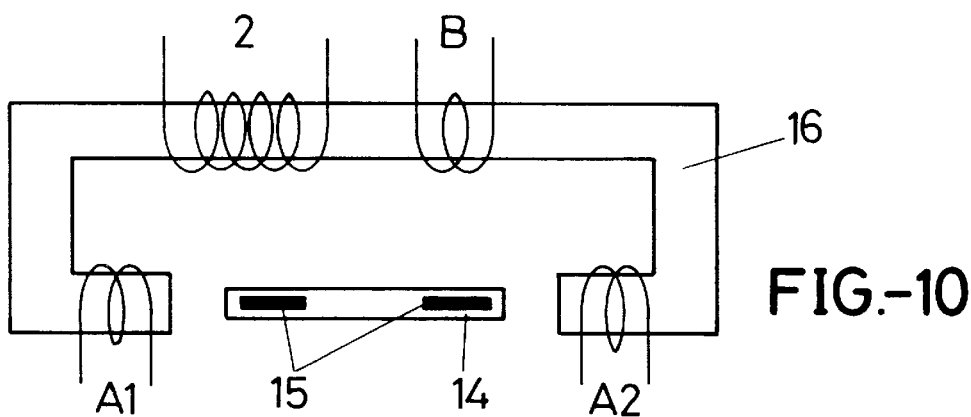
FIG. 10 shows an arrangement of emitters and receivers that is particularly useful for detecting the marker(s) in any position.

The arrangement that allows the marker (15) to be detected in any position is shown in FIG. 10. In this position, receivers (A1) and (A2) are connected in series and in phase and a winding equivalent to (A) in FIGS. 8 and 9 is obtained.

The magnetic core (16) material is elected so as to have little losses at the working field frequency and not to be saturated at the electromagnetic field intensity used. It shall typically comprise ferrite material.

Figure 11:
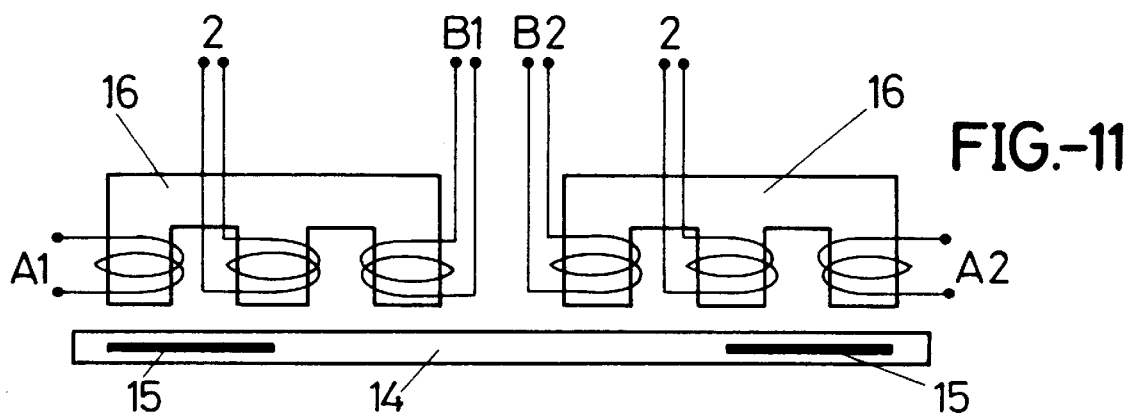
FIG. 11 shows an arrangement of sensors using a double set of emitters and receivers, particularly useful in avoiding document lateral displacement influences.

Finally, the arrangement of sensors in FIG. 11, using a double set of emitters (2) and receivers, is particularly useful to avoid influences in side movements of the document (14). Receiver windings (A1) and (A2) will be connected to each other in phase, the same as (B1) and (B2) and the emitter (2) windings. Another arrangement derived from FIG. 11 would comprise adding a similar one to the lower portion in such a way that the assembly with four cores (16) in "E" would minimise the influences of the displacement of the document (14) on both the horizontal and vertical axes.

In the latter two arrangements, the existence of two markers (15) has been considered. In the event of there being only one the system proposed is also valid, for its presence could also be detected irrespective of its being in a position or in symmetry. In any event, the cores (16) in "E" would be located and sized in order for the marker (15) to be located substantially between the central area and one of the sides, whereas the other side portion of such core is free.

We claim:

1. A process for high speed measurement and characterization of magnetic materials, for validating documents carrying markers comprising magnetic materials, and for distinguishing different markers from each other precisely as to composition, dimensions and position within a document, comprising the steps of:

supplying a low frequency signal to emitter windings for generating an interrogator field;

generating a first output when a magnetic material is present in said interrogator field but not when the magnetic material is outside of said interrogator field and a second output representing said interrogator field;

producing an analog signal from said first output;

obtaining a time reference signal from said second output;

generating an impulse signal from said analog signal;

generating a digital signal representing an amplitude of each analog signal peak;

eliminating false readings, influenced by noise, by selecting cycles of said time reference signal in which said digital signal has a maximum amplitude; and selecting a reading of said digital signal in the selected cycles which is most stable for use, together with said time reference signal and said impulse signal, in validating said documents.

2. A device for high speed measurement and characterization of magnetic materials, for validating documents carrying markers comprising magnetic materials, and for distinguishing different markers from each other precisely as to composition, dimensions and position within a document, comprising:

an oscillator for supplying a low frequency signal to emitter windings for generating an interrogator field;

receiving and amplifying means for generating a first output when a magnetic material is present in said interrogator field but not when the magnetic material is outside of said interrogator field and a second output representing said interrogator field;

analog signal producing means for producing an analog signal from said first output;

amplifying means for obtaining a time reference signal from said second output;

amplifying means for generating an impulse signal from said analog signal;

detecting and converting means for generating a digital signal representing an amplitude of each analog signal peak; and processing means for eliminating false readings, influenced by noise, by selecting cycles of said time reference signal in which said digital signal has a maximum amplitude and selecting a reading of said digital signal in the selected cycles which is most stable for use, together with said time reference signal and said impulse signal, in validating said documents.

* * * * *